US009151513B1

(12) United States Patent
Daw et al.

(10) Patent No.: US 9,151,513 B1
(45) Date of Patent: Oct. 6, 2015

(54) APPARATUS AND METHOD FOR PLACEMENT OF ANGLE PLATES IN TRANSVERSE DUCT FLANGES

(71) Applicant: HVAC Inventors/Systemation, Inc., Providence, RI (US)

(72) Inventors: David E. Daw, Cranston, RI (US); Cody B. Umberger, Oak Ridge, NJ (US)

(73) Assignee: HVAC Inventors/Systemation, Inc., Province, RI (US)

( * ) Notice: Subject to any disclaimer, the term of this patent is extended or adjusted under 35 U.S.C. 154(b) by 0 days.

(21) Appl. No.: 14/576,480

(22) Filed: Dec. 19, 2014

Related U.S. Application Data

(62) Division of application No. 14/484,667, filed on Sep. 12, 2014, now Pat. No. 8,959,755, which is a division of application No. 14/211,733, filed on Mar. 14, 2014, now Pat. No. 8,875,388.

(60) Provisional application No. 61/852,032, filed on Mar. 15, 2013, provisional application No. 61/852,025, filed on Mar. 15, 2013.

(51) Int. Cl.
| | |
|---|---|
| *F24F 13/02* | (2006.01) |
| *B23P 19/04* | (2006.01) |
| *B23P 19/00* | (2006.01) |
| *B23P 11/00* | (2006.01) |
| *B23P 19/02* | (2006.01) |
| *B23P 19/027* | (2006.01) |
| *B23Q 3/00* | (2006.01) |
| *B23Q 3/06* | (2006.01) |
| *E04F 17/04* | (2006.01) |

(52) U.S. Cl.
CPC ............ *F24F 13/0209* (2013.01); *B23P 19/001* (2013.01); *B23P 19/04* (2013.01); *B23P 11/005* (2013.01); *B23P 19/004* (2013.01); *B23P 19/006* (2013.01); *B23P 19/02* (2013.01); *B23P 19/027* (2013.01); *B23Q 3/002* (2013.01); *B23Q 3/062* (2013.01); *B23Q 3/069* (2013.01); *B23Q 2703/10* (2013.01); *E04F 17/04* (2013.01); *F24F 13/0245* (2013.01); *Y10T 29/49915* (2015.01); *Y10T 29/53065* (2015.01); *Y10T 29/53083* (2015.01); *Y10T 29/53483* (2015.01); *Y10T 29/53522* (2015.01); *Y10T 29/53961* (2015.01)

(58) Field of Classification Search
CPC ...... B23P 11/00; B23P 11/005; B23P 19/001; B23P 19/004; B23P 19/006; B23P 19/02; B23P 19/027; B23P 19/04; B23Q 3/002; B23Q 3/06; B23Q 3/069; B23Q 2703/10; E04F 17/04; F24F 13/0209; F24F 13/0245
See application file for complete search history.

(56) References Cited

U.S. PATENT DOCUMENTS

| | | | | |
|---|---|---|---|---|
| 4,946,341 | A * | 8/1990 | Parsley et al. | 414/796.7 |
| 5,283,944 | A * | 2/1994 | Goodhue | 29/701 |
| 2012/0266995 | A1* | 10/2012 | Carson | 138/107 |

* cited by examiner

*Primary Examiner* — Alexander P Taousakis
*Assistant Examiner* — Matthew P Travers
(74) *Attorney, Agent, or Firm* — Breiner & Breiner, L.L.C.

(57) ABSTRACT

An apparatus and method are described for inserting angle plates in transverse duct flanges. The apparatus is especially useful in inserting angle plates into transverse duct flanges of duct fittings. Packages for holding angle plates are also described.

18 Claims, 14 Drawing Sheets

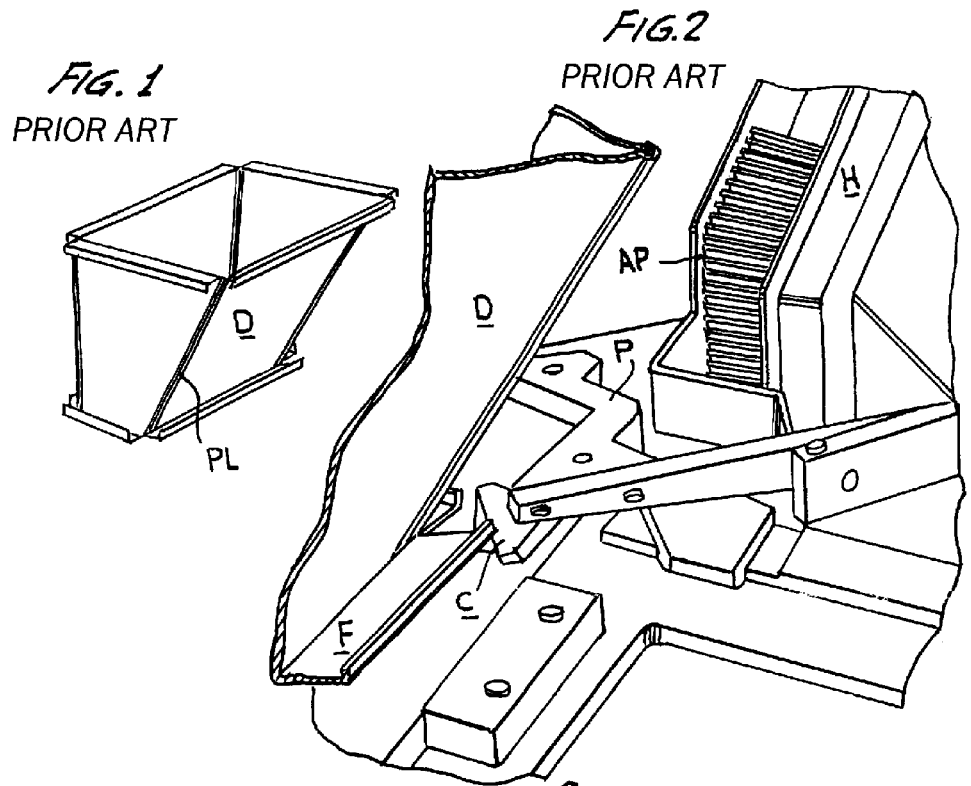
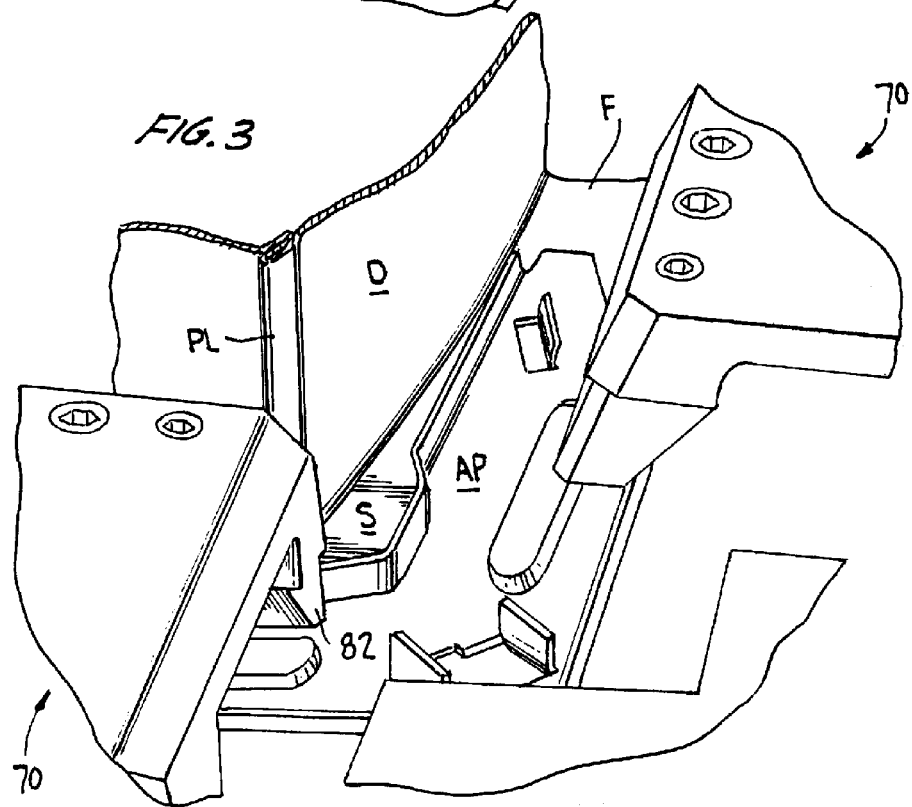

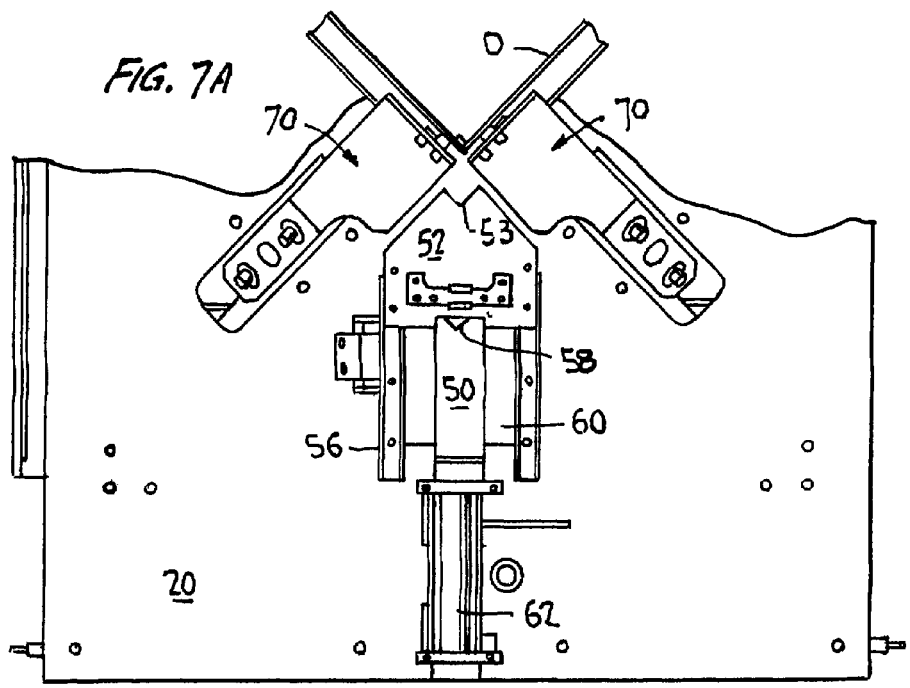
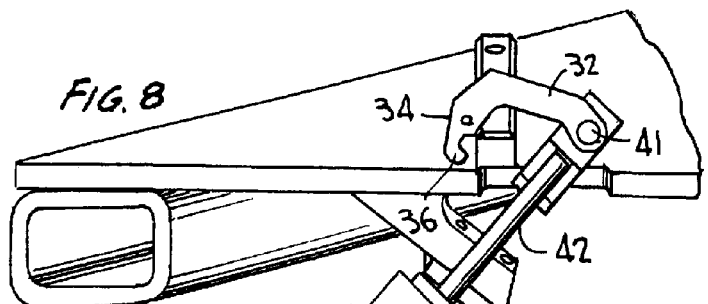
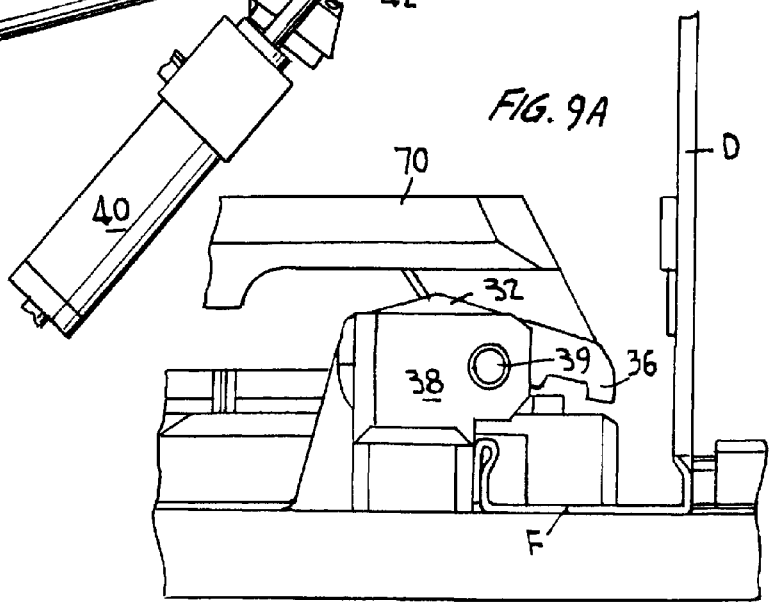

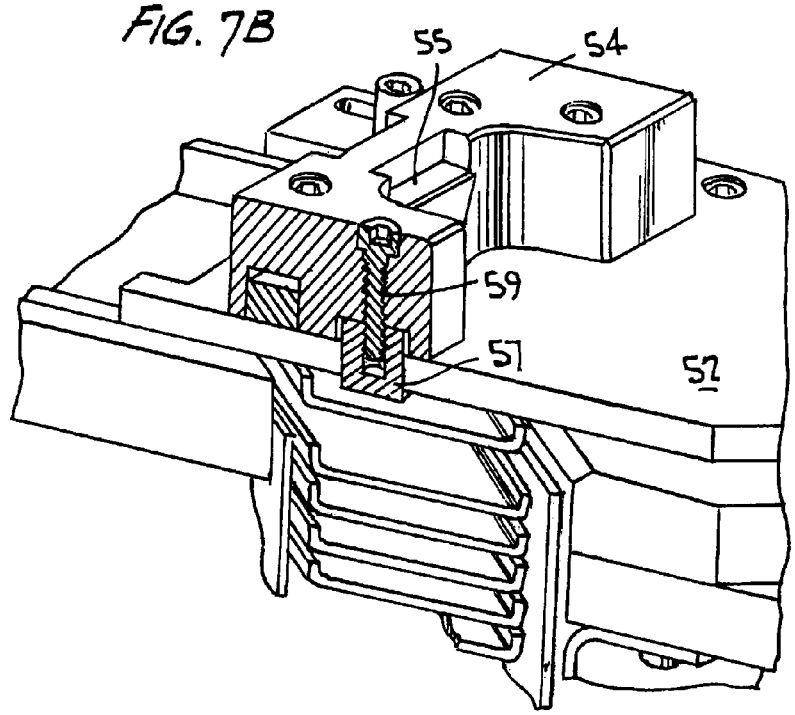
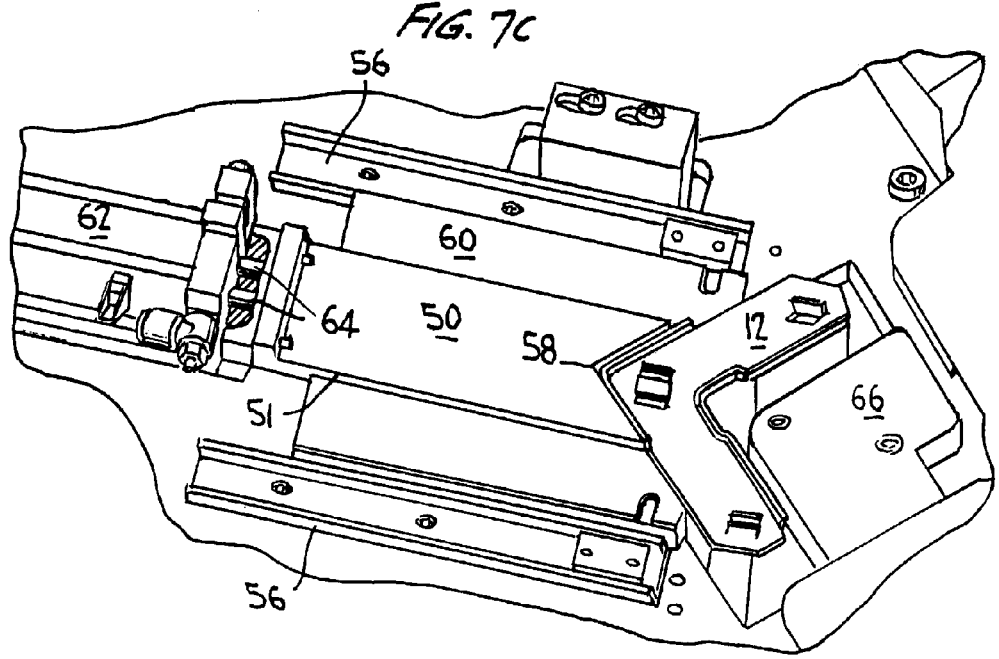

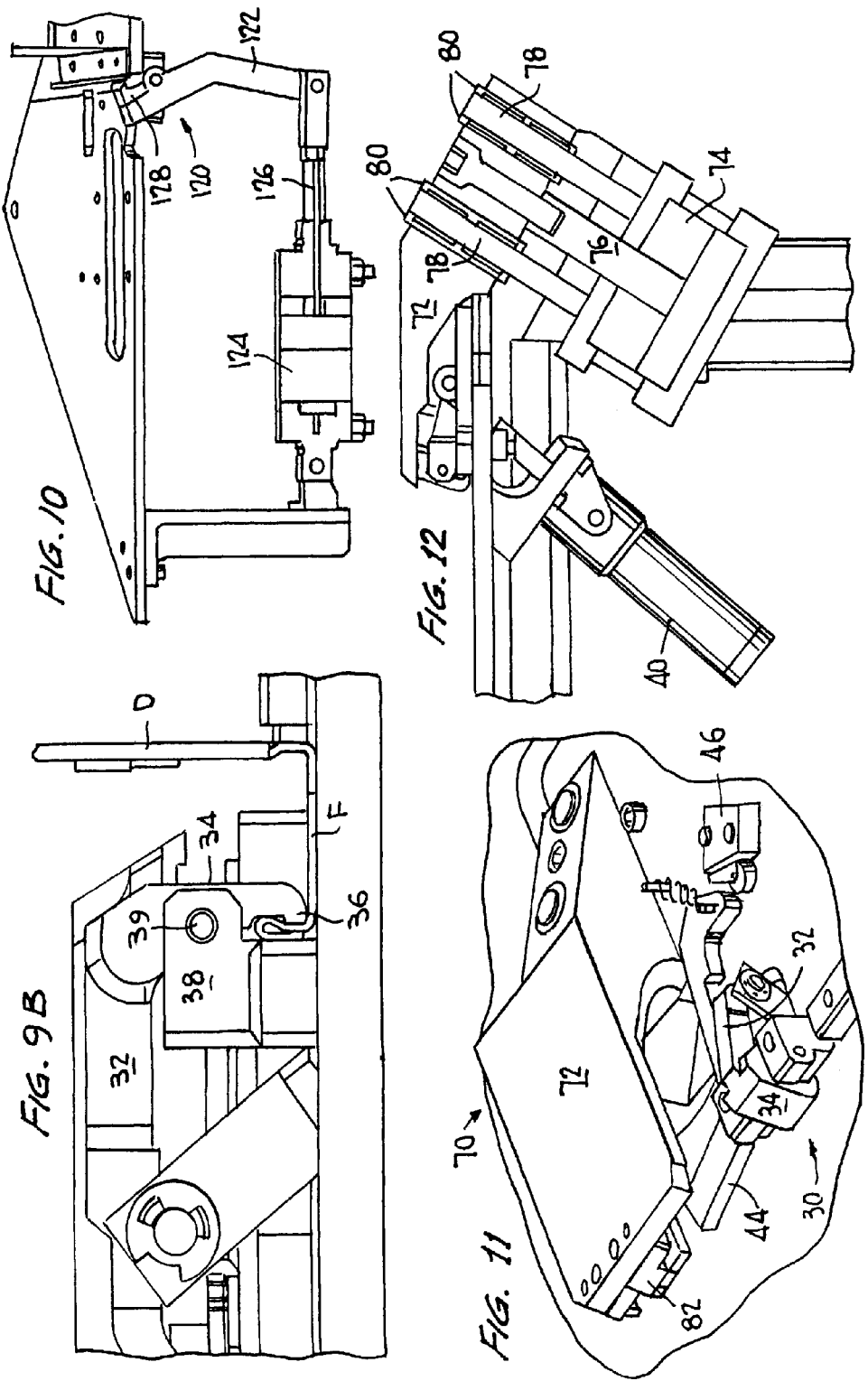

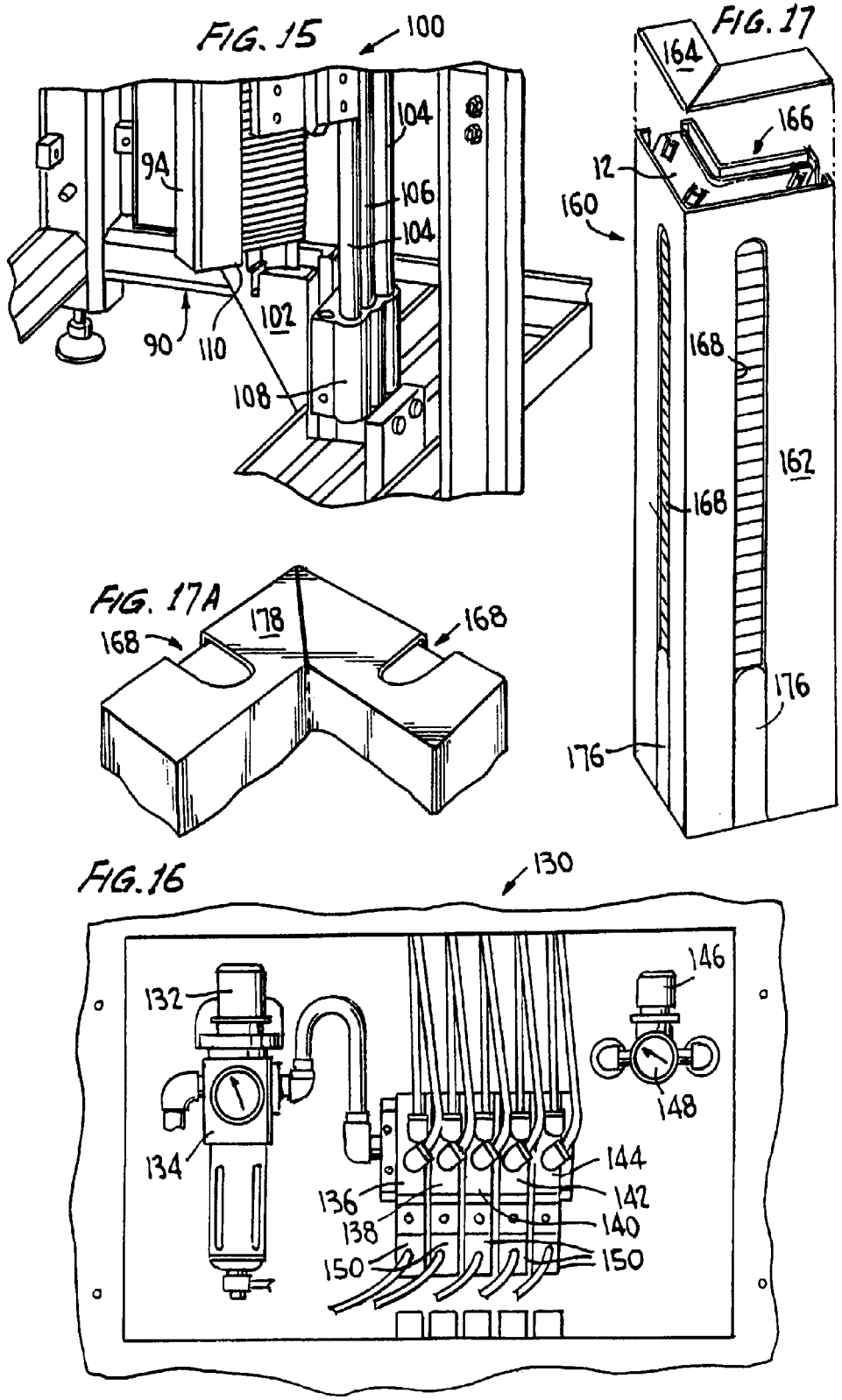

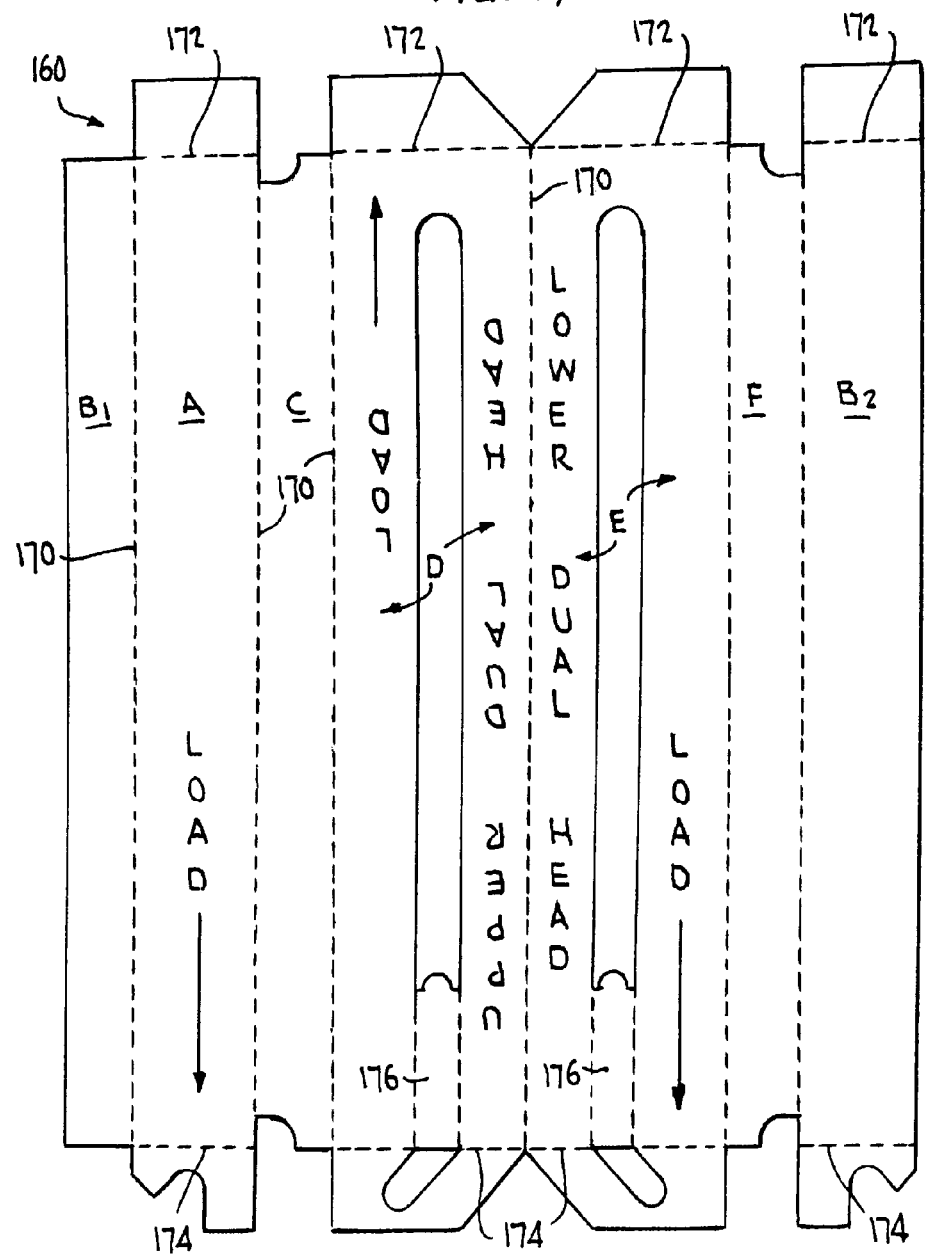

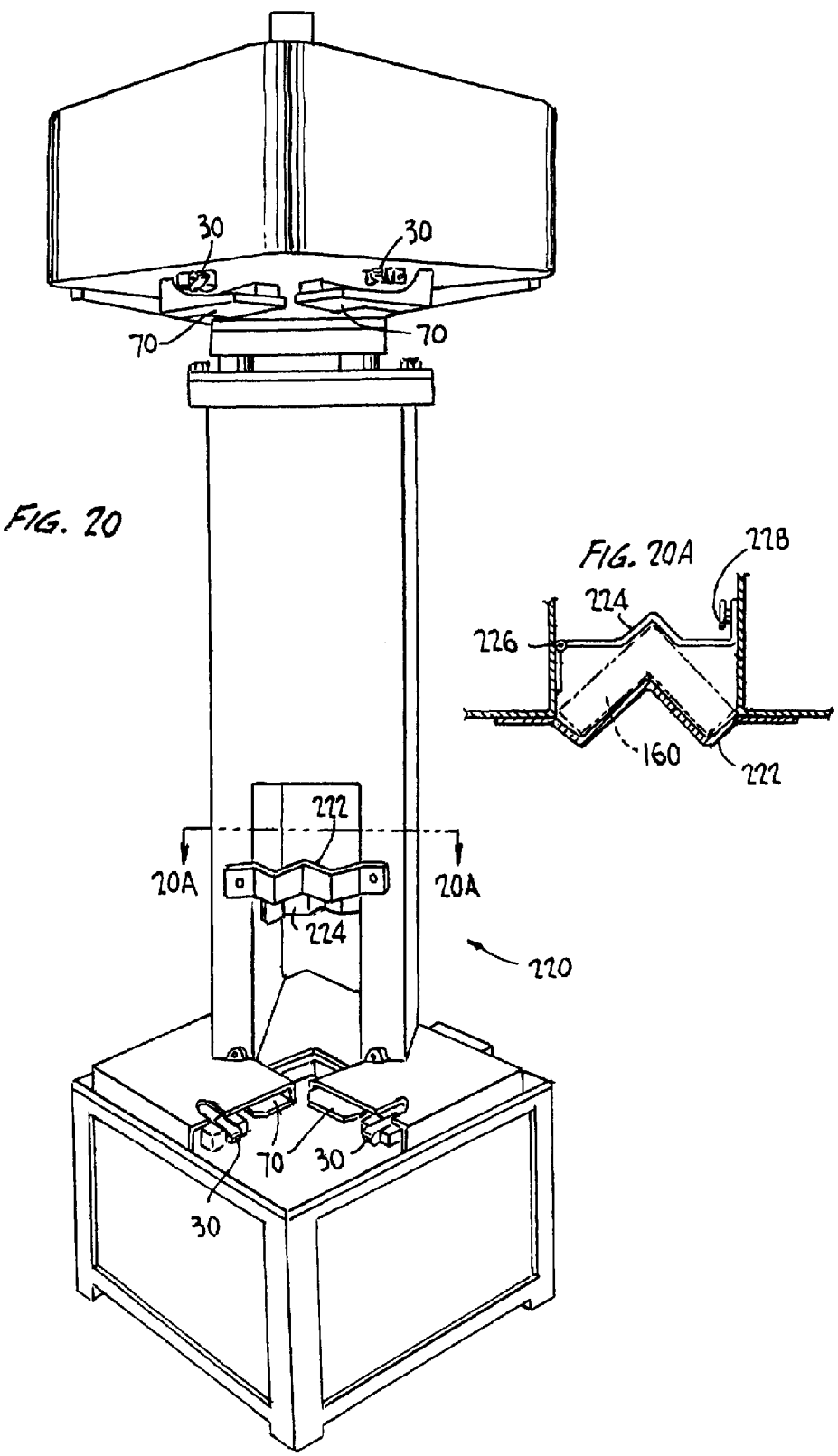

APPARATUS AND METHOD FOR PLACEMENT OF ANGLE PLATES IN TRANSVERSE DUCT FLANGES

RELATED APPLICATIONS

This application claims benefit of U.S. application Ser. No. 14/484,667 filed Sep. 12, 2014, entitled "Apparatus and Method for Placement of Angle Plates in Transverse Duct Flanges," which claims benefit of U.S. application Ser. No. 14/211,733 filed Mar. 14, 2014, entitled "Apparatus and Method for Placement of Angle Plates in Transverse Duct Flanges," now U.S. Pat. No. 8,875,388 B1, which claims benefit of U.S. provisional application Ser. No. 61/852,032, filed Mar. 15, 2013, entitled "Apparatus and Method for Placement of Angle Plates in Transverse Duct Flanges," and U.S. provisional application Ser. No. 61/852,025, filed Mar. 15, 2013, entitled "Hopper and Angle Plate Packages for Corner Inserter Machines," all of these applications incorporated herein by reference in their entirety.

FIELD OF THE INVENTION

This invention relates to the placement of angle plates into the corner defined by channel flanges at the ends of panels of a duct. More specifically, the invention relates to apparatus for and methods of automatically placing the angle plates into the channel flanges of ducts once a duct is positioned relative to the machinery, and the invention is especially useful for duct fittings having irregular shapes.

BACKGROUND OF THE INVENTION

Apparatus and methods for placement of angle plates in transverse duct flanges are known and disclosed in U.S. Pat. Nos. 5,283,944; 5,321,880; and 5,342,100, the disclosures of these patents being incorporated in their entirety herein by reference. Commercial apparatus using the inventions of these patents have been sold under the trademark CORNERMATIC® by the Iowa Precision Industries Division of Mestek Machinery, Inc. ("IPI"). These machines have been commercially successful and have transformed the industry with respect to the insertion of angle plates into duct work. Additionally, U.S. Pat. No. 5,926,937 discloses a mobile apparatus for placement of angle plates in transverse duct flanges, the disclosure therein being incorporated in its entirety herein by reference. This latter patented technology has been manufactured commercially by IPI and sold under the trademark CORNER CADET®.

The CORNERMATIC® and CORNER CADET® apparatus and methods have been commercially successful. They have saved the industry substantial time and money and made the insertion of angle plates into ducts substantially easier for sheet metal fabricators, including saving wear and tear on the human body. However, the CORNERMATIC® and CORNER CADET® machines usually cannot accept irregular shaped duct fittings referred to in the industry and herein as "fittings." For example, FIG. 1 shows duct fitting D and its irregular shape. Additionally, fitting D includes Pittsburgh locks PL at the corners of the duct. Referring to FIG. 2, there is shown the fitting D of FIG. 1 and the IPI CORNER CADET® machine. As shown in FIG. 2, the fitting D will not fit into the machine for the automatic insertion of angle plates AP. As seen, the top of the fitting will contact the angle plate supply hopper H of the machine and/or the fitting will contact the press member P of the machine. This prevents the duct flanges F from being positioned in the machine such that the fitting may be clamped in place by clamp C, receive an angle plate AP, the angle plate thereafter pressed into the flange by press member P and a subsequent crimping operation. Workers must, therefore, manually insert the angle plates into the flanges of fittings and then hammer the angle plate into the fitting, and thereafter "crimp" the duct flange by further hammering the flange over the angle plate. Accordingly, the worker spends substantial time in such insertion, slowing down operations, causing expense to the fabricating shop, causing potential damage to the flange and wear and tear on the human body.

Additionally, the fabrication of duct work, including fittings, is not always precise and the duct flanges may be bent or the corners of the duct are of an irregular shape. For example, referring to FIG. 3, there is shown a partial section of duct D having at Pittsburgh lock PL and flanges F. The duct D is not precise in its fabrication, including at the Pittsburgh lock PL, and angle plate AP will not fit properly into the flange leaving a space S. In such instances, the CORNERMATIC® and CORNER CADET® machines may have difficulty in automatically inserting angle plates into the duct flange or may not be able to automatically insert the angle plate. In the latter situation, the angle plate must be removed and manually inserted, thereby causing additional time for the worker, expense to the duct fabrication shop and potential damage to the flange.

The CORNERMATIC® and CORNER CADET® machines include supply hoppers which feed the angle plates. These hoppers are above the angle plate feed mechanism which slides an angle plate from the bottom of a stack in the hopper into the duct flange. With respect to the CORNERMATIC® and CORNER CADET® machines, the hopper may be in the way of a duct fitting precluding the automatic insertion of an angle plate as referenced above in FIG. 2 and requiring the manual insertion by the worker.

Referring to FIG. 4, there is shown an angle plate 12 useful in the CORNERMATIC® and CORNER CADET® machines and manufactured and sold by IPI and Ductmate Industries, Inc. ("Ductmate") under the trademark CORNERMATIC®. These angle plates come in different dimensions for use in either TDC or TDF duct flanges. The angle plates are sold in cartons of 250 angle plates. The angle plates are stacked in ten columns of twenty-five. The worker must take each column of twenty-five angle plates from the carton using a metal rod placed through bolt hole opening 18 of the angle plate, or by hand, and hand load each column into the angle plate supply hopper of the CORNERMATIC® and CORNER CADET® machines. In some instances, after a number of columns from the carton are loaded, the remaining columns fall over, thereby requiring the loading of the angle plates individually or in small groups. While these machines have saved the industry substantial time and expense, the hand loading of the angle plates still takes time. Accordingly, there is room for improvement to the packaging and loading of angle plates.

In duct fabrication plants, the duct work is first formed and thereafter the angle plates are inserted into the duct work. Presently, each duct fabrication shop is set up differently, and there is no method for a work flow comprising an orderly and economical manufacture of the duct fittings and the automatic insertion of angle plates into the fittings.

Accordingly, while the CORNERMATIC® and CORNER CADET® machines have been an extremely successful "work-horse" in duct fabricating shops, improvement to these machines and methods of use is possible. This is applicable for, among other things, insertion of angle plates into fittings; the automatic insertion of angle plates into duct flanges which are not precise in manufacture or which are bent; and the packaging and loading of angle plates. There is also a need for a method of the work flow in duct fabrication shops to efficiently and economically fabricate fittings and automatically insert angle plates therein.

SUMMARY OF THE INVENTION

A primary object of the present invention is to provide a new machine for automatically inserting angle plates into duct flanges, including fittings.

Another primary object of the present invention is to provide a new machine for automatically inserting angle plates into duct flanges wherein the angle plate supply hopper is out of the way of the operation and below the work area.

Another primary object of the present invention is to provide new clamping members which will pull the flange of the duct outward and will also straighten out any duct flange which has been deformed, thereby providing for easier receipt of the angle plate into the duct flange.

Another primary object of the present invention is to provide new packages for angle plates to allow the loading of a large number of angle plates into a supply hopper of a corner inserter machine for inserting angle plates.

Another primary object of the invention is to provide a new, efficient and economical work flow pattern for the manufacture of the duct fittings.

The present invention comprises a new apparatus and method for automatically inserting angle plates into duct flanges and especially for fittings. The apparatus includes novel features and improvements over the CORNER-MATIC® and CORNER CADET® machines including, but not limited to, (1) a new apparatus for the automatic insertion of angle plates into duct flanges, including fittings; (2) a new clamp for clamping duct flanges; (3) a new supply hopper located out of the area of operation; (4) a new presser for pressing the angle plates into the duct flanges; and (5) combinations of the above and other features of the apparatus as discussed herein.

The present invention further includes new packaging for the angle plates which packages include a plurality of angle plates, including in the range of 50 to 100 angle plates, which may be inserted directly into the hopper, thereby saving the time and expense associated with the manual insertion of the angle plates in limited numbers. The packaging may include, but is not limited to, a plurality of angle plates contained in a self-contained sleeve preferably made of cardboard but not limited thereto; a plurality of angle plates held together by one or more strap members; and a plurality of angle plates having a V-shape paper backing and one or more strap members.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 1 is a perspective view of a duct fitting.

FIG. 2 is a partial perspective view of the duct fitting of FIG. 1 and a CORNER CADET® automatic corner inserter machine.

FIG. 3 is a partial perspective view of a piece of duct not precisely made and an angle plate on the flanges thereof and the presser heads of the invention.

FIG. 7A is a further partial top view of the machine of FIG. 5 having the protective cover removed and showing a duct in position for insertion of an angle plate.

FIG. 7B is a close-up view in partial cross-section showing the cover for the angle plate supply hopper and angle plates in the supply hopper.

FIG. 7C is a further partial top view of the machine of FIG. 5 showing the feed member of the machine and having the cover for the angle plate supply hopper removed for ease of reference.

FIG. 8 shows a close-up view of a clamping member of the invention.

FIG. 9A is a partial side view of the clamping member and a duct flange prior to clamping the duct flange.

FIG. 9B is a partial side view of the clamping member and a duct flange with the duct flange clamped in the machine.

FIG. 10 is a close-up view of a crimping member of the invention.

FIG. 11 is a close-up view showing a press member of the invention.

FIG. 12 is a side view in partial cross-section showing a press member.

FIG. 15 is a close-up view of FIG. 14 showing the supply hopper and elevator for the supply hopper.

FIG. 16 is a close-up view of the side of the machine showing the panel of the pneumatic system.

FIG. 17 is a perspective view of a package of angle plates.

FIG. 17A is a partial bottom view of the angle plate package of FIG. 17.

FIG. 17B is a package blank for the package of FIG. 17 prior to fabrication.

FIG. 20 is a dual head corner inserter machine using various features of the invention.

FIG. 20A is taken along the line 20A-20A of FIG. 20 showing a V-shaped bracket and a hinged gate for holding a package of angle plates, the package shown in phantom lines.

DETAILED DESCRIPTION OF THE PREFERRED EMBODIMENTS

Referring to Figures, the present invention is directed to a new apparatus and method for automatically inserting angle plates into duct flanges and particularly into irregular shaped duct fittings. Additionally, the invention is directed to a method of use of the apparatus situated in a duct fabricator's shop for an efficient and economical work flow in the fabrication of duct fittings.

Figure 5:
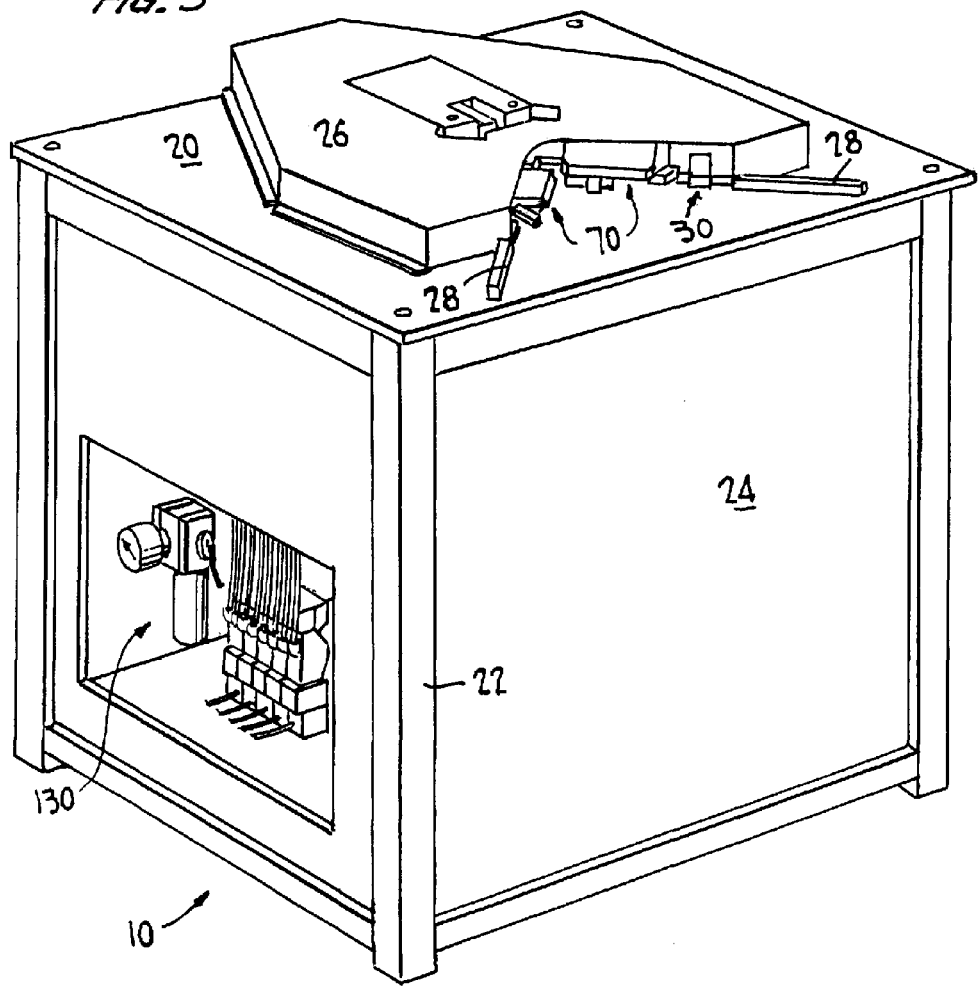
FIG. 5 is a perspective view of a machine in accordance with the invention.
Figure 6:
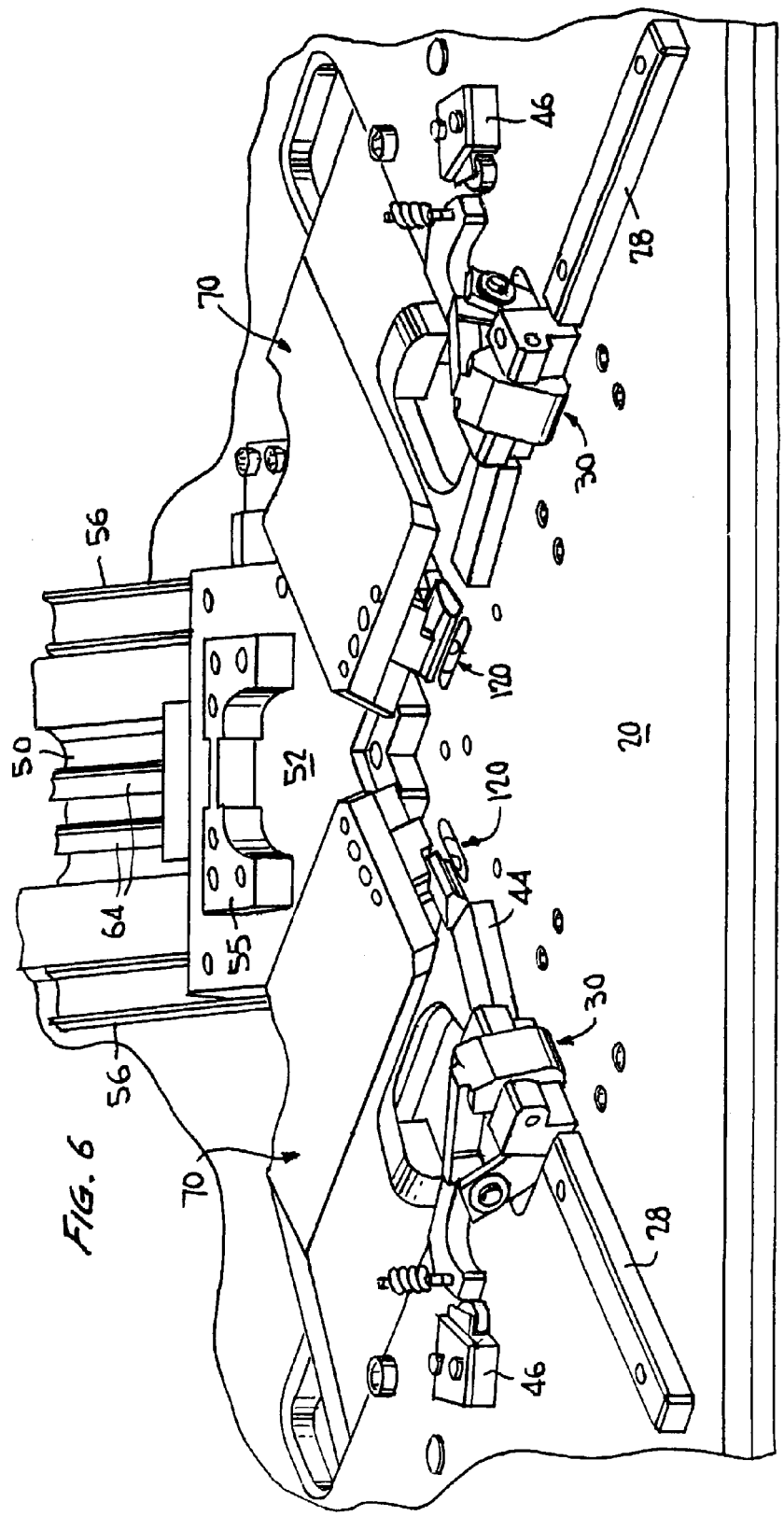
FIG. 6 is a top enlarged view of the machine of FIG. 5 having the protective cover removed.
Figure 7:
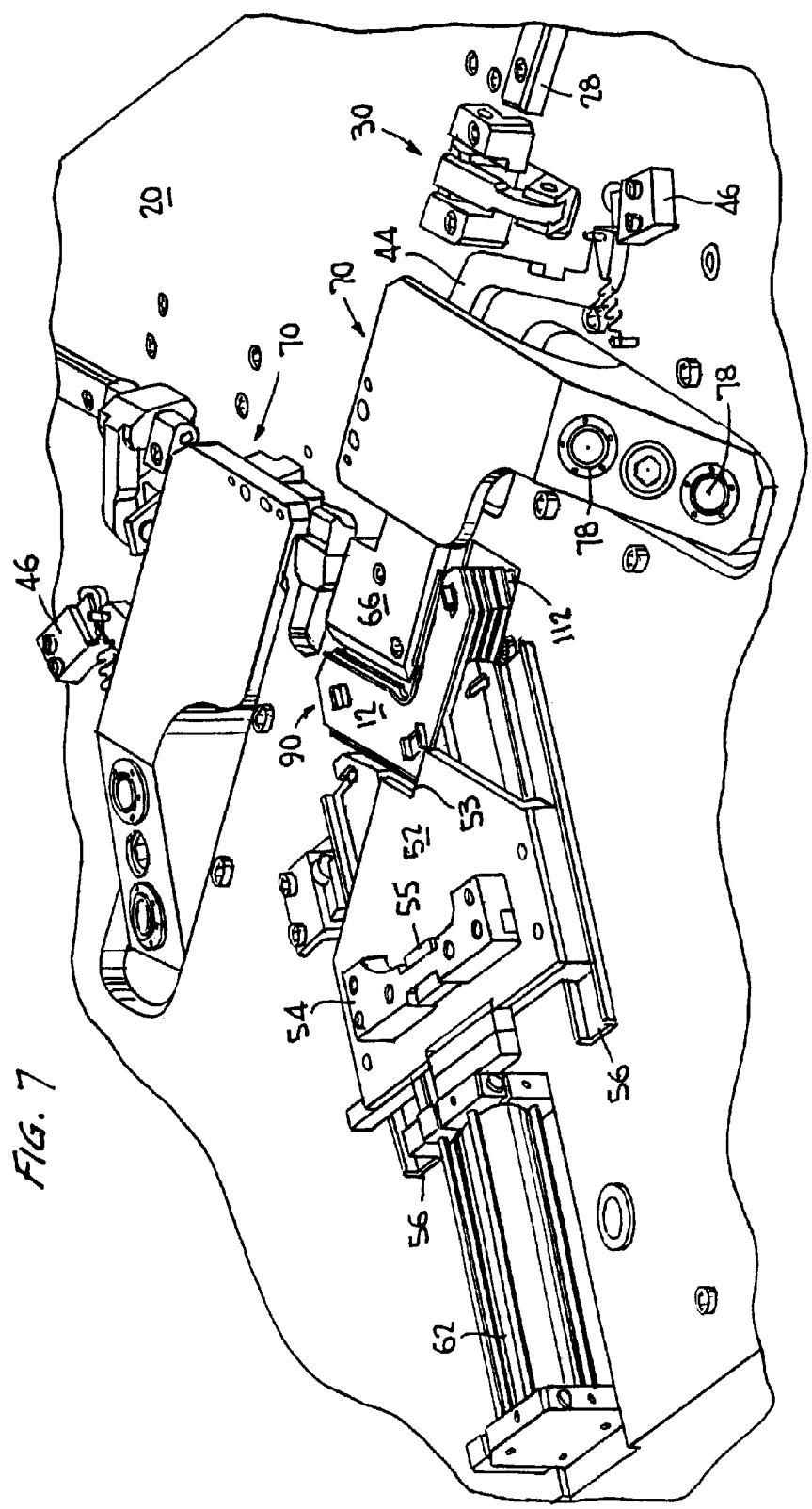
FIG. 7 is a further top enlarged view of the machine of FIG. 5 having the protective cover removed and showing the cover for the angle plate supply hopper pulled back.

Referring to FIGS. 5-7 for illustration, the apparatus 10 of the invention generally includes a table type structure having a platen or base plate 20 upon which the duct fitting will be placed for insertion of an angle plate. The apparatus 10 may include legs 22, sides 24, protective cover 26, and guides posts 28. Guides posts 28 aide in positioning a duct in the machine. It is understood that a work table will be placed adjacent to the machine for working with the duct and angle plate insertion, although a table top may be made as part of the machine. The primary components of the apparatus as discussed in greater detail hereafter include the platen 20, clamp members 30 for clamping the duct in position; a feed member 50 for feeding an angle plate into place in the duct flange; press members 70 for pressing an angle plate into the flange; an angle plate supply hopper 90 located out of the work area and beneath the platen for supplying angle plates to the feed member from an angle plate package; and crimper members 120 for crimping the duct flange after the angle plate has been inserted into the duct flange. These primary features of the invention will be discussed in greater detail below.

With respect to the clamp members 30, as shown for example in FIGS. 6, 7, 8, and 9, the clamp member 30 includes a clamp arm 32 for clamping the duct work in place as shown in FIGS. 9A and 9B. There are two clamp members 30 which function the same and clamp adjacent flanges of a duct. Clamp arm 32 includes a clamp head 34 and clamp finger 36 which engages the duct flange. Clamp arm 32 is connected to clamp block 38 by a pin 39 upon which the clamp arm 32 pivots. Clamp 30 is attached to an air cylinder 40 by pin member 41. Piston 42 moves the clamp arm 32 from an unclamped to a clamped position. The clamp members 30 are triggered to clamp the duct work in place by triggers 44 and electrical switches 46 as seen, for example, in FIGS. 6 and 7. When the duct flanges engage triggers 44, the triggers 44 engage switches 46 which cause air cylinder 40 and piston 42 to move the clamp arms 32 downward and clamp the duct flange into position. More specifically, referring to FIG. 9A, there is shown a TDC duct D having flange F in position to be clamped in place by clamp 30. FIG. 9B shows the duct clamped in place. During the clamping process, the clamp members 30 pull the flange of the duct outward and will also straighten out any duct flange which has been deformed. This provides for easier receipt of an angle plate into the duct flange. More specifically, the clamp members 30 pull the duct into place and then clamps the duct into position as shown in FIG. 9B for receiving the angle plate. In doing so, it flattens out the flanges so that there is no interference between the duct flange and the feeding of the angle plate to the duct flange. The clamp members 30 also open up the area of the channel which allows for easier placement of an angle plate into the flange.

Referring, for example, to FIGS. 6, 7, 7A, 7B and 7C, the feed member 50 feeds the angle plate into the duct flange. It should be noted that cover 52 is pulled back in FIG. 7 to illustrate the location of the angle plates 12. In operation, the cover 52 covers the angle plates as shown, for example, in FIGS. 6 and 7A. The cover includes a V-shaped portion 53, generally overlying and exposing the duct flange corner and an angle plate when inserted, and a housing 54 connected to the cover by suitable fastening members. The housing may be grasped at handle 55 to move the cover along tracks 56. Cover 54 and handle 55 include a locking mechanism (not shown) to lock cover 52 in place. The housing may also include two magnets 57 for engaging the angle plates for ease of moving the angle plates into position in the duct flange as discussed hereafter, although it is understood that a different number of magnets may be used. The magnets preferably have 16 lbs. of pull. The cover 52 is pulled back when inserting a package of angle plates as discussed hereafter. The feed member 50 is similar to that disclosed in U.S. Pat. No. 5,283,944 and which is incorporated herein by reference. Referring, for example, to FIGS. 7A and 7C, the feed member 50 slides forward and has a V-shaped member 58 which engages an angle plate 12 and moves the angle plate into engagement with the duct flange. The feed member 50 moves along a tracks 51 in plate 60. Feed member 50 as shown in the Figures is operated by an air cylinder 62 having piston rods 64 connected to feed plate 50. The operating stroke of the piston rods 64 and feed plate 50 push an angle plate from the top of the stack of angle plates in an angle plate package over plate 66 to engage an adjacent corner of a duct and overlying the two adjacent channel flanges.

When the feed member 50 pushes the angle plate into place in the duct, it may hold the angle plate against the corner of the duct prior to presser members 70 pressing the angle plates into place.

Referring, for example, to FIGS. 6, 7, 11 and 12, the apparatus includes press members 70 adjacent to each side of the duct work. The pressers 70 will press the angle plate down into position in the duct flange. Preferably, the pressers 70 will press the angle plate at an angle of approximately sixty degrees, although the presser angle may be in the range of 50 to 90 degrees. During the pressing operation, the angle plate is held in place and is pushed back against the duct wall. This provides for ease of insertion of the angle plate into the flange and works well when the duct flange is not exact in construction or the corner of the duct is not square as shown, for example, in FIG. 3.

Referring to FIG. 12, there is shown a partial cross-section of an air cylinder of the press member 70 showing a press head 72 connected to an air cylinder 74 having a piston rod 76 for moving the press head 72 for pressing an angle plate. Additionally, the press assembly includes two rods 78 and four linear bearings 80 for guidance of the press head. The press head includes a press wedge 82 for contacting the angle plate and pressing the angle plate into the flange, including holding the angle plate in place and pressing the angle plate against the duct wall.

Figure 13:
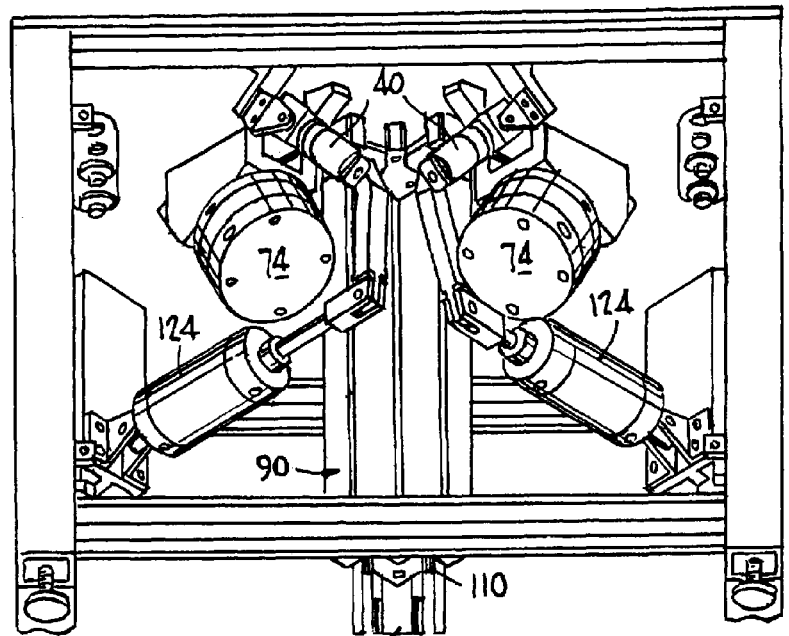
FIG. 13 is a side elevational view of the invention showing the underside of the machine, including actuating members for the machine.
Figure 14:
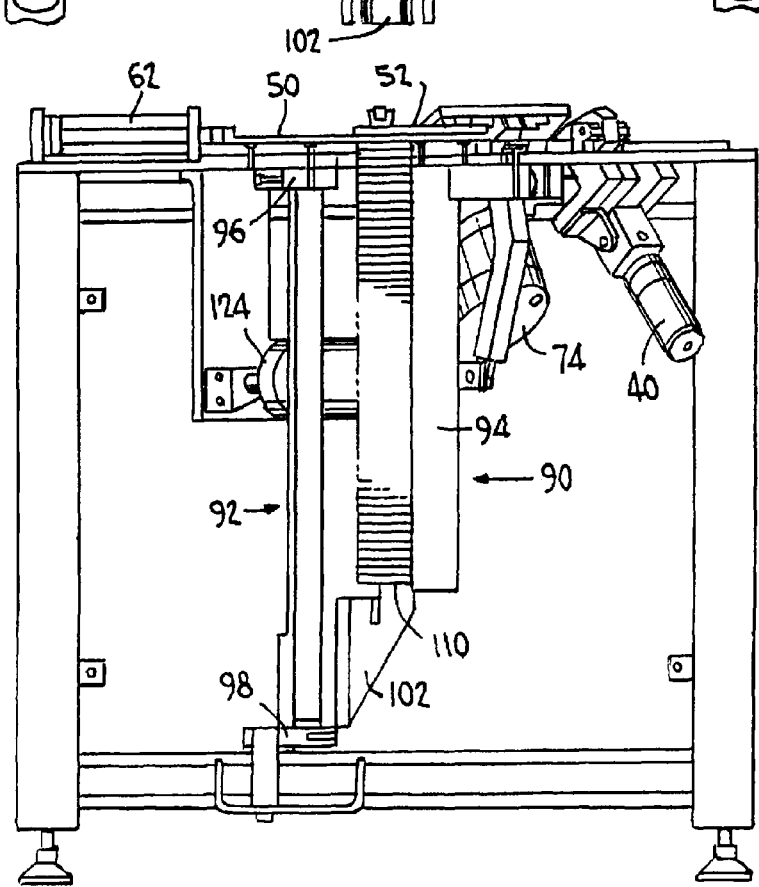
FIG. 14 is a side elevational view of the machine showing the angle plate supply hopper.

Referring, for example, to FIGS. 13, 14 and 15, the apparatus includes a supply hopper 90. The supply hopper 90 is located under the platen 20 of the apparatus. Accordingly, the supply hopper is located out of the work area; provides for a larger unobstructed work area; and allows for the insertion of angle plates into fittings. The supply hopper 90 comprises an elevator member 92 which raises the angle plates into position for the feed member 50 to slide the angle plate into place in the duct flange. The elevator 92 comprises a V-shaped steel magazine 94 for holding the angle plates held in place by mounting plates 96 and 98; and a rodless air cylinder 100 having finger plates 102. The rodless air cylinder 100 is made by BIMBA and includes two rods 104, a cylinder body 106 and a carriage 108. Attached to the rodless air cylinder are finger plates 102 having fingers 110 which engage the angle plates (the angle plates are preferably in a package as in FIG.

17 and are shown in these Figures with the packaging cut away to show the angle plates). The supply hopper generally provides constant upward pressure. The angle plates are held in position by a cover 52. The cover is pulled back for the loading of the angle plate magazine such as shown in FIG. 7. When moving the angle plates upward in the elevator, it has been found useful to use 60 lbs. of air pressure.

Referring to FIG. 7B, there is shown a partial cross section of cover 52 and the angle plates in the supply hopper. The cover 52 includes a housing member 54 attached to cover 52 for moving the cover as discussed above. Housing member 54 includes magnets 57 (only one shown) held in place by a suitable fastener 59. Magnets 57 have been found useful for engaging the angle plate and holding it in position before feed member 50 moves the angle plate into position over the duct flange. The use of magnets 57 will correct for any manufacturing error that may cause the angle plate to be slanted when stacked in the angle plate package.

When the angle plate cylinder is empty, the machine will automatically shut down until angle plates are reloaded. A new package of angle plates is inserted by pulling the cover 52 back and inserting the angle plate package, for example as shown in FIG. 17 as discussed hereafter, and thereafter moving the cover 52 forward to cover the angle plates.

When loading the angle plate magazine 94 with an angle plate package as shown, for example, in FIG. 17, into the supply hopper 90, the package is placed through opening 112 in the platen and dropped into place. The angle plates will come in a package of, for example, eighty angle plates, as discussed hereafter. Once inserted, the cover is moved over the angle plate as shown in FIG. 7A. In operation, the angle plates will be lifted upward by the elevator 92 for insertion into the duct flange.

Referring, for example, to FIGS. 6, 7 and 10, the apparatus includes crimper members 120 for crimping the duct flange to hold the angle plate in the flange. The crimper mechanism is generally as disclosed in U.S. Pat. No. 5,283,944 and incorporated herein by reference. The crimper members 120 extend upwardly through an opening in the platen 20. Each crimping member is carried by an angle lever 122 which is pivotally mounted on a pivot pin. The angle lever is connected to an air cylinder 124 having a piston rod 126 for movement of the angle lever. The crimper member 120 includes crimper arm 128 for engaging and crimping the duct flange.

Figure 4:
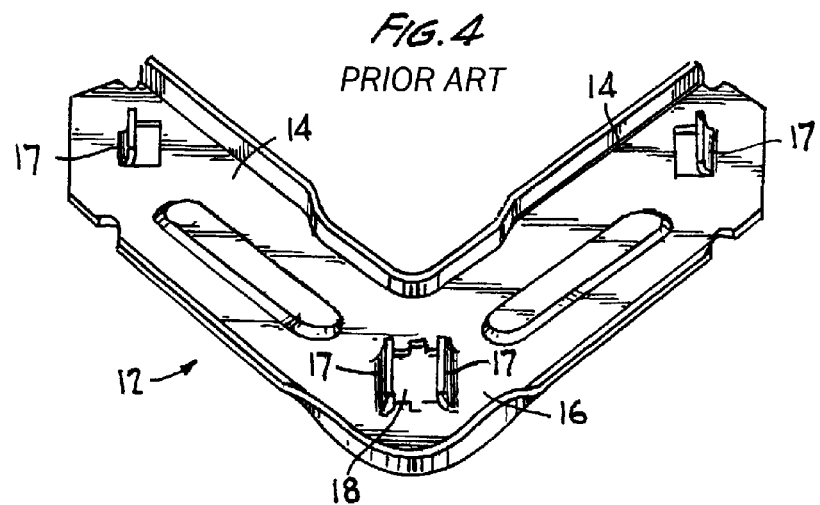
FIG. 4 is a perspective view of an angle plate.

The angle plate 12 useful in the invention and in the packaging discussed hereafter is as disclosed in, for example, U.S. Pat. No. 5,342,100, and sold commercially by IPI and Ductmate under the trademark CORNERMATIC® and shown in FIG. 4. The angle plate 12 includes legs 14, corner 16, projections 17 and bolt hole 18.

Referring to FIG. 16, there is shown the pneumatic control panel 130. This panel includes two air regulators and a pneumatic manifold with control valves. Each valve has a manual override which can be used for setup and maintenance. The control panel includes incoming air supply regulator 132; incoming air supply regulator gauge 134; valve 136 for the clamping members; valve 138 for the feed member; valve 140 for the presser members; valve 142 for the crimping members; valve 144 for the elevator member; elevator pressure regulator 146; and elevator pressure regulator gauge 148. Each valve has a manual override valve 150. Pressure settings for the system may be at 100 PSI and the angle plate elevator pressure at 50 PSI. It is understood that the apparatus may also be operated by electrical controls or other means known to those skilled in the art.

The operating sequence of the machine, as discussed hereafter, is controlled by a programmable logic control (PLC) which may be located in an electrical enclosure on the machine (not shown). The machine may operate with a standard 115 VAC outlet circuit. When the machine is plugged into a power source, power may be applied to the system and the PLC by pressing on a power on push-button switch. Power may be removed by pressing a power off push-button switch. The machine operation may be controlled by a series of inputs within the PLC. As discussed below, the sequence is activated by the triggers 44 which activate switches 46 that connect to inputs of the PLC. Once these inputs are activated, the sequence of the corner insertion begins and steps through to completion as discussed hereafter.

In operation, the duct fitting will be placed on the platen 20 of the apparatus and pushed against guide posts 28 where it will engage triggers 44 which will engage switches 46. This causes the clamp members 30 to clamp the duct work into place. During the clamping stage, the clamps will pull the flange of the duct outward and straighten out the flange for easier receipt of the angle plate. The clamp will also pull the duct in place and then flatten the flanges so that there is no interference of the duct during the angle plate feed cycle. This also widens out the flange and allows for easier integration of the angle plate into the flange. Once the duct fitting is clamped in place, feed member 50 moves an angle plate into place in the duct flange. Feed member 50 with V-shaped portion 53 may hold the angle plate against the corner of the duct prior to the presser pressing the angle plate into the flange. Once the angle plate is in place, press members 70 will press the angle plate down into position in the duct flange. The pressers press the angle plates at an angle of approximately sixty degrees. The press wedge 82 holds the angle plate in place and also moves the angle plate back into the duct walls. Once the angle plate is pressed into place, crimpers 120 will cause crimping arms 128 to crimp the flange over the angle plate to hold the angle plate in the flange. An angle plate is inserted in each corner of the duct and, thereafter, the fitting is removed from the machine.

Referring to FIGS. 17, 17A and 17B, there is illustrated a package 160 for angle plates for insertion in opening 112 of platen 20. In a preferred embodiment, the package 160 is preloaded with angle plates and is disposable. The package includes a cardboard sleeve 162 holding a plurality of angle plates 12 in place, and preferably in the range of 50 to 100 angle plates and more preferably in the range of 70 to 90 angles and most preferably 80 angle plates. The top of the cardboard sleeve will include a removable portion 164 for creating an opening 166 exposing angle plates 12. In operation, the angle plates are pushed up through the opening 166 in the package by elevator 92 of the corner inserter machine. Referring to FIG. 17A, there is shown the bottom of package 160 having openings 168 and which extend up the two side walls as shown in FIG. 17. Fingers 110 of the elevator 92 engage the angle plates through the openings 168 and move the angle plates upward.

Referring to FIG. 17B, there is shown a package blank for package 160 prior to fabrication, including with instructions for use. The package 160 may be used in the present invention as set forth above. The package 160 may also be used in the CORNERMATIC® machines as sold by IPI and disclosed in U.S. Pat. No. 5,283,944 with modification to the apparatus as discussed hereafter. The packaging includes perforations 170 in the side wall portions, perforation 172 in to top wall portions, and perforations 174 in the bottom wall portions, all for folding and forming the packaging to provide for the V-shaped configuration having walls A-F, wall B is formed by sections B1 and B2, with wall 31 being glued or otherwise adhered to wall B2.

Additionally, the package includes removable pull tabs 176 which helps keep the box integrity when shipping and handling the package. As seen in FIG. 173, the packaging is marked such to disclose use of the packaging in the current invention at section A, sold by IPI under the trademark COR-NERMATIC® PLUS™. When used in the present invention, the top portion 164 is removed and pull tabs 176 are removed, and then the packaging inserted into the supply hopper as discussed above. When using the packaging with the COR-NERMATIC® dual head machine, the packaging is marked at Section E for inserting in the lower dual head of the machine whereby the pull tabs 176 are removed and the bottom portion 178 is removed and the package is inserted into the lower head of the machine. When used in the upper dual head of the CORNERMATIC® machine, as referenced at section D, the opposite end 164 of the packaging 160 is removed for inserting corners into the upper head of the machine.

Again referring to FIG. 17, the package 160 is preferably made of cardboard and is disposable. It is understood that the packaging may be made of other materials and be reusable without departing from the scope of the invention. For example, the package may be made of plastic which is disposable or reusable. Similarly, the package may be made of metal and reusable. Reusable packages are not preferred as this requires the insertion of angle plates in the package and defeats the time saving element of the package. Notwithstanding, a metal package may be used and is substantially similar to package 160 with the exception that it may have an open top end and will not require tabs 176. Thus, a metal reusable package will include a sleeve 162, having an open top end 166, and a bottom 178 having openings 168 for allowing elevator 92 to move angle plates 12 upward in the supply hopper.

Figure 18:
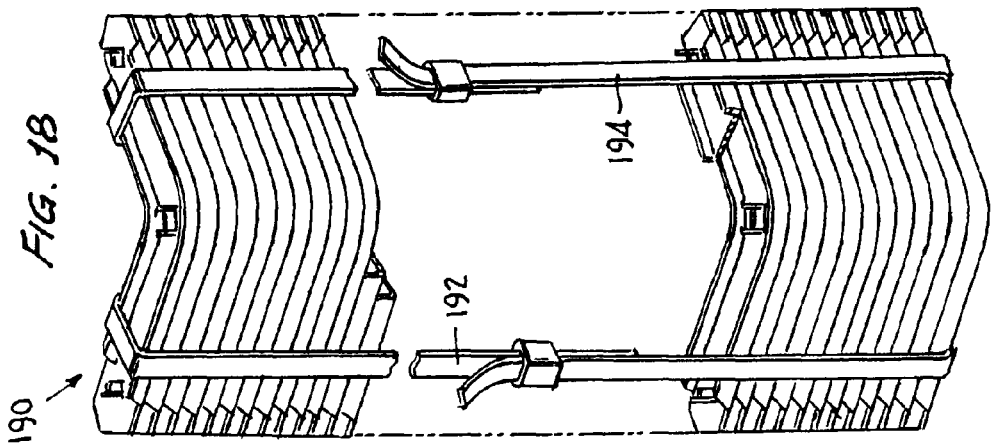
FIG. 18 is an alternative embodiment of an angle plate package.

Referring to FIG. 18, there is illustrated an alternate embodiment 190 of the packaging for a plurality of angle plates 12, e.g. eighty angle plates. The packaging includes straps 192 and 194 for holding the angle plates in place. The straps are preferably made of plastic, but may be made of metal or other suitable material, e.g. wire, twine or cloth. The angle plates are inserted into the supply hopper and the straps are then cut.

Figure 19A:
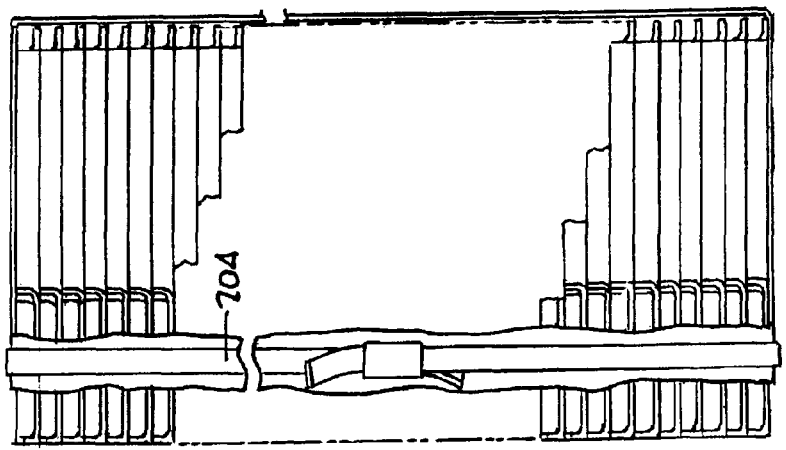
FIG. 19A is a front view of the angle plate package of FIG. 19.
Figure 19:
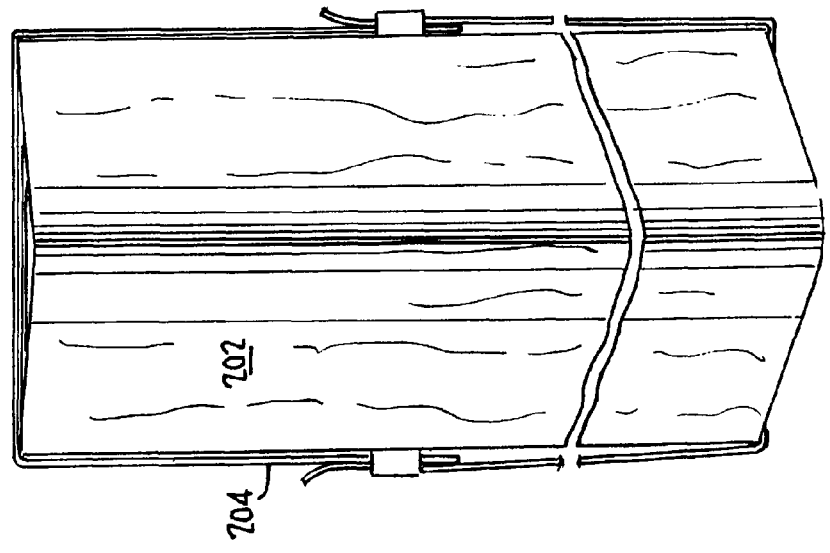
FIG. 19 is an alternative embodiment of an angle plate package.

Referring to FIGS. 19 and 19A, there is illustrated an alternative embodiment 200 of the packaging which includes a V-shaped paper material 202 for aligning the angle plates and a strap 204 for holding the angle plates in place. The packaging is inserted into the hopper and thereafter the strap is cut.

It is understood that other variations of packaging may be used in the invention without departing from the scope thereof. For example, a plurality of angle plates may be held together by wire inserted through the openings in the legs and corner of the angle plate or by other fastening members.

As stated above, the CORNERMATIC® machines sold by IPI have worked extremely well and have been commercially successful. It is understood that various aspects of the invention disclosed herein may be also useful on the CORNER-MATIC® machine. For example, the clamping members 30 disclosed herein may be used on the CORNERMATIC® machine. Similarly, the presser members 70 disclosed herein may also be used on the CORNERMATIC® machine, although the press members will axially press the angle plate. It is believed that the use of the clamp members 30 will make the CORNERMATIC® machine even more efficient. Similarly, the CORNERMATIC® machine may use the new angle plate packages. For example, referring to FIGS. 20 and 20A, there is shown a dual head corner inserter machine 220 having clamping members 30 and presser members 70 in the lower head and the upper head. The machine has a V-shaped bracket 222 in the lower head for receiving a package 160 (shown in phantom lines in FIG. 20A) of angle plates and which is held in place by a gate 224. Gate 224 is opened and closed on hinge 226. Latch 228 maintains gate 224 closed. While not shown, the upper head of the apparatus includes a similar V-shaped bracket 222 for receiving a package 160 of angle plates and which is held in place by gate 224.

Figure 21:
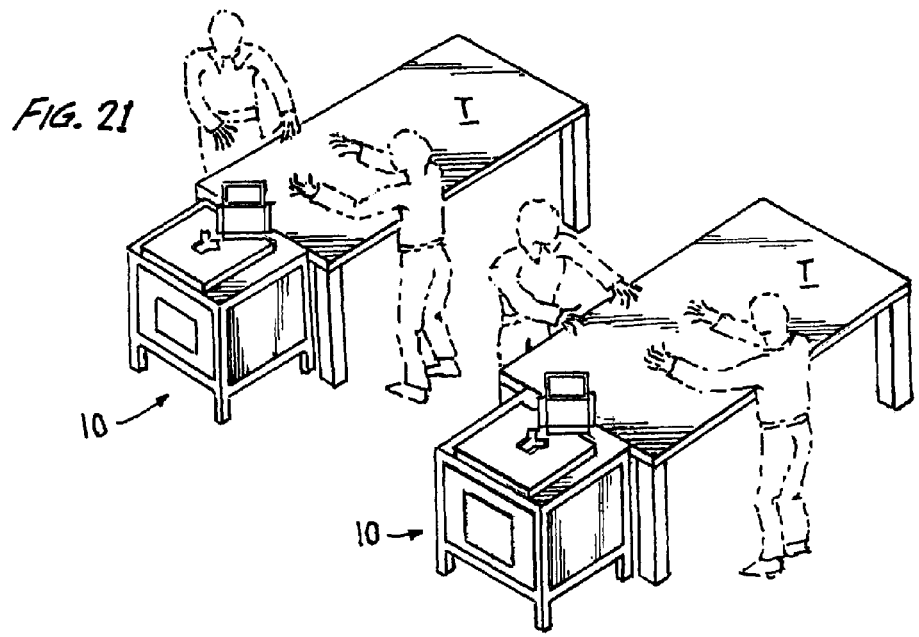
FIG. 21 illustrates a method of fitting fabrication.

Referring to FIGS. 21-24, the present invention further includes a method for fabricating a duct fitting and the automatic insertion of angle plates in the duct fitting. Presently, duct fittings are manufactured in a fabricator's shop in the following sequence: sheet metal sections for the duct fitting are cut on a plasma table; the sheet metal sections are thereafter moved to another location in which the worker fabricates the duct fitting; angle plates are then inserted into the duct fitting manually whereby the worker hammers an angle plate into a corner of the duct fitting and thereafter hammers the flange over the angle plate to keep it in place; and the worker does this for each corner of the duct. This process is time consuming and physically demanding on the worker. Referring to FIG. 21, the method of the present invention includes a work station having an apparatus 10 and table T. Preferably, as shown in FIG. 21, there are two work stations side by side. There are one or more workers at each work station, in a preferred method two workers. One worker first places the duct fitting sheet metal sections on the table and fabricates the fitting. Thereafter, this worker automatically inserts the angle plates using apparatus 10. A second worker may work at the table performing the same functions. Accordingly, at one work station, the fitting may be fabricated and the corners automatically inserted. As an alternative, one worker may fabricate the fitting and the other worker automatically insert the angle plates and then move the completed fitting to a storage location in the shop.

Figure 22:
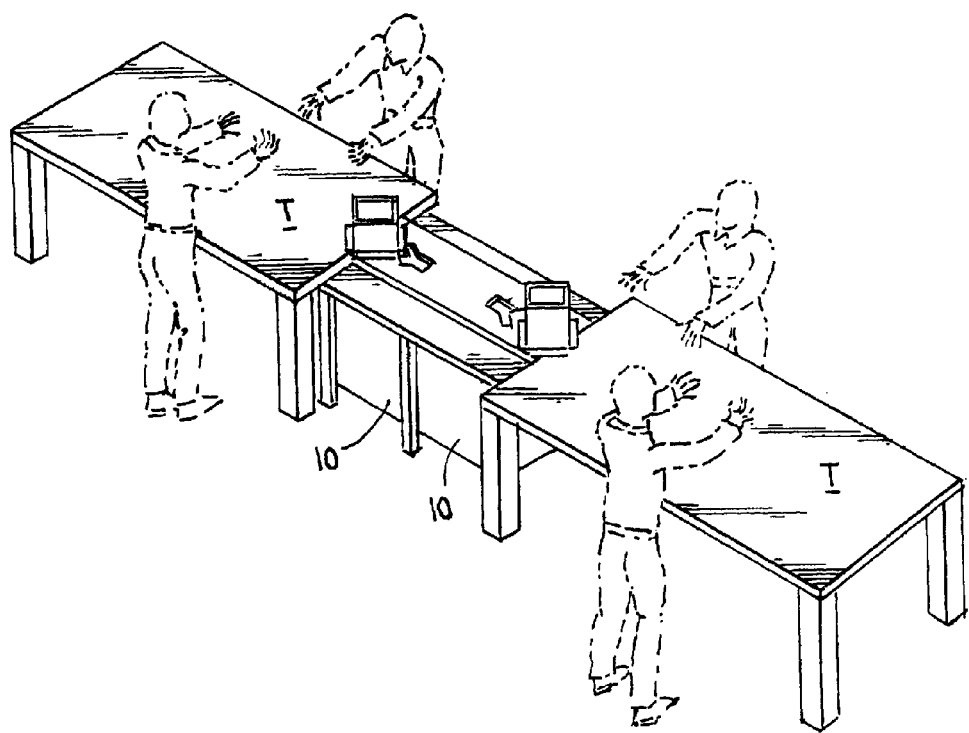
FIG. 22 illustrates an alternate method of fitting fabrication.
Figure 23:
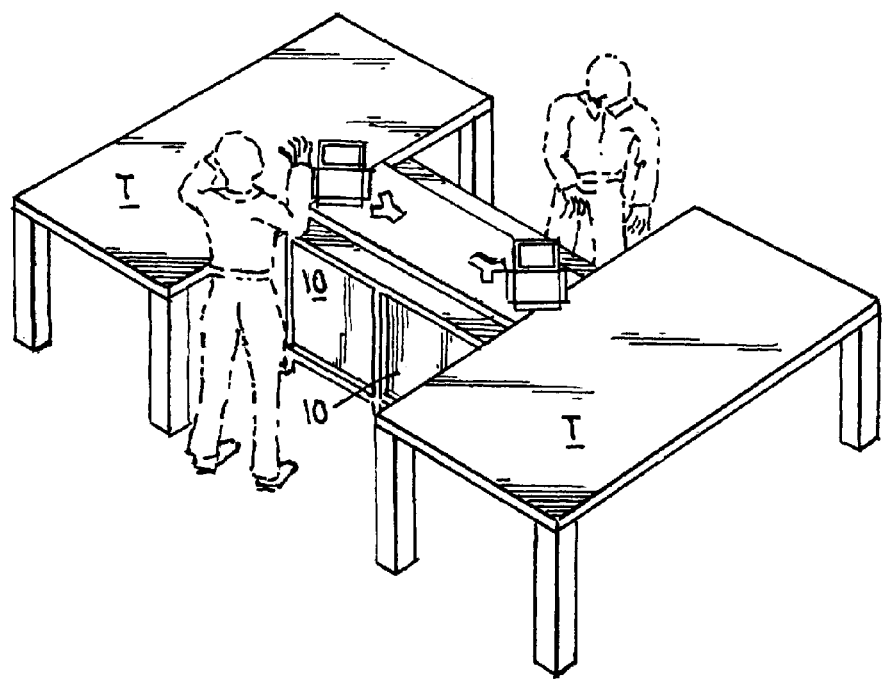
FIG. 23 illustrates an alternate method of fitting fabrication.
Figure 24:
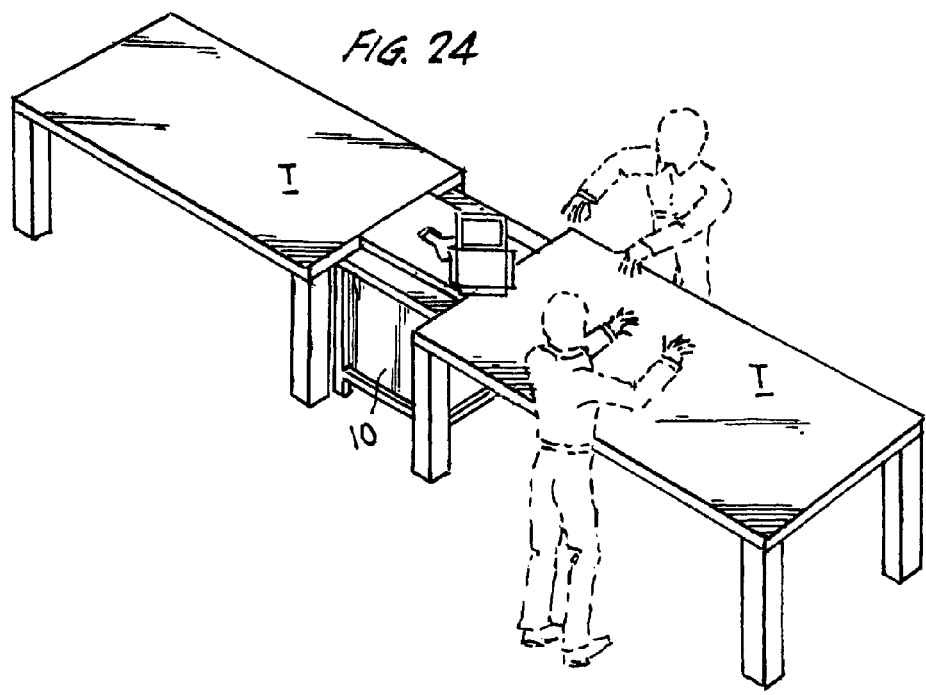
FIG. 24 illustrates an alternate method of fitting fabrication.

Referring to FIGS. 22-24, there are shown alternative embodiments of methods for the work flow of automatically inserting angle plates into fittings. FIG. 22 illustrates an alternative embodiment of the work station. In this embodiment, the work station comprises two apparatus 10 placed back to back with a work table T at each side. A worker will be on each side of each work table to fabricate the duct fitting, insert the angle plates and then remove the duct fitting as discussed above for the work station in FIG. 21.

FIG. 23 illustrates a further alternative embodiment. In this embodiment, the work station comprises two apparatus 10 placed back to back with a table T placed at each side perpendicular to the apparatus.

FIG. 24 illustrates an alternative embodiment similar to FIG. 22 utilizing one apparatus 10 and two work tables T.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. An apparatus for automatically assembling an angle plate in channel shaped flanges at ends of duct panels joined in a corner to form a duct section, said apparatus comprising:

a platen adapted for engaging an end of a duct in a preselected position relative to said platen and said platen includes a substantially unobstructed work area adapted to receive a duct fitting;

clamping members adapted for locking a duct in a preselected position relative to said platen;

a supply hopper for angle plates located underneath said platen adapted for advancing upwardly an angle plate for insertion into said duct;

an angle plate advancing member adapted for advancing an angle plate into engagement with a corner of a clamped duct section; and pressing members adapted for pressing an angle plate into said corners of said duct.

2. An apparatus according to claim 1 wherein each duct flange has a free side edge, and there are means for crimping said side edges over said angle plate.

3. An apparatus according to claim 2 further comprising a trigger member and an electric switch to activate said insertion and a PLC member to control sequence operation of components of said apparatus.

4. An apparatus according to claim 3 wherein said supply hopper further comprises an elevator for advancing said angle plate into position relative to said angle plate advancing member.

5. An apparatus according to claim 4 wherein said elevator comprises a V-shaped magazine for holding angle plates, an air cylinder and finger plates adapted to engage said angle plates.

6. An apparatus according to claim 3 wherein each of said clamping members, angle plate elevator, angle plate advancing member, pressing members, and crimping members is activated by a separate air cylinder.

7. An apparatus according to claim 1 wherein said clamping members comprise a clamp arm, a clamp head and a clamp finger adapted to engage said duct flange to lock said flange in place.

8. An apparatus according to claim 1 wherein said angle plate advancing member comprises a feed member having a V-shape notch for engaging an angle plate.

9. An apparatus according to claim 1 wherein said pressing members comprise a press head having a press wedge adapted for engaging an angle plate and pressing said angle plate into said duct flange.

10. An apparatus according to claim 9 wherein said pressing members press said angle plate into said duct flange at an angle in a range of about 50 to about 90 degrees.

11. An apparatus according to claim 1 further comprising a moveable cover for said supply hopper.

12. An apparatus according to claim 11 wherein said movable cover includes at least one magnet adapted to engage an angle plate in said supply hopper to position said angle plate for engagement with said angle plate advancing member.

13. An apparatus according to claim 1 adapted to receive duct fittings and automatically insert angle plates in said duct fittings.

14. An apparatus according to claim 1 wherein said supply hopper is adapted to receive a package of angle plates wherein said package comprises a sleeve.

15. An apparatus according to claim 14 wherein said sleeve further includes at least one closure member at an end thereof.

16. An apparatus according to claim 15 wherein said sleeve is made from a material selected from the group consisting of cardboard, plastic and metal.

17. An apparatus according to claim 15 wherein said sleeve is adapted to hold a plurality of angle plates in a range of 50 to 100 angle plates.

18. An apparatus according to claim 14 wherein said sleeve further includes a closure member at each end thereof and each said closure member is removable.

* * * * *